(12) United States Patent  (10) Patent No.: US 7,540,333 B2
Bettin et al.  (45) Date of Patent: Jun. 2, 2009

(54) ROW UNIT DOWN PRESSURE ASSEMBLY

(75) Inventors: Leonard A. Bettin, LaGrange Park, IL (US); Travis Lester Harnetiaux, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 475 days.

(21) Appl. No.: 11/206,880

(22) Filed: Aug. 18, 2005

(65) Prior Publication Data

US 2007/0039746 A1  Feb. 22, 2007

(51) Int. Cl.
*A01B 15/00* (2006.01)
(52) U.S. Cl. .................... 172/744; 172/397; 172/677
(58) Field of Classification Search ............... 172/310, 172/311, 397, 398, 677, 678, 679, 680, 744, 172/776
See application file for complete search history.

(56) References Cited

U.S. PATENT DOCUMENTS

| 856,033 | A | * | 6/1907 | Crisler | 172/572 |
|---|---|---|---|---|---|
| 1,189,615 | A | * | 7/1916 | Nelson et al. | 172/678 |
| 3,450,210 | A | * | 6/1969 | Smith | 172/130 |
| 4,623,024 | A | * | 11/1986 | Schlenker | 172/572 |
| 4,700,785 | A | * | 10/1987 | Bartusek et al. | 172/705 |
| 4,702,323 | A | * | 10/1987 | Smit et al. | 172/156 |
| 4,766,962 | A | * | 8/1988 | Frase | 172/624.5 |
| 4,834,189 | A | * | 5/1989 | Peterson et al. | 172/166 |
| 4,846,084 | A | * | 7/1989 | Sigle | 111/136 |
| 5,279,236 | A | * | 1/1994 | Truax | 111/139 |
| 5,450,908 | A | * | 9/1995 | Hagman et al. | 172/239 |
| 5,529,128 | A | * | 6/1996 | Peterson et al. | 172/145 |
| 5,544,709 | A | * | 8/1996 | Lowe et al. | 172/661 |
| 5,555,824 | A | * | 9/1996 | Stufflebeam et al. | 111/62 |
| 5,573,072 | A | | 11/1996 | Evane et al. | |
| 5,724,903 | A | * | 3/1998 | Yoder et al. | 111/194 |
| 6,347,594 | B1 | | 2/2002 | Wendling et al. | |
| 6,454,019 | B1 | | 9/2002 | Prairie et al. | |
| 7,401,561 | B1 | * | 7/2008 | Kurz | 111/62 |
| 2007/0022926 | A1 | * | 2/2007 | Flikkema et al. | 111/62 |

* cited by examiner

*Primary Examiner*—Thomas B Will
*Assistant Examiner*—Joel F Mitchell
(74) *Attorney, Agent, or Firm*—Rebecca Henkel

(57) ABSTRACT

A down pressure assembly for incorporation into an agricultural implement to be pulled by a tractor (10) has an attachment frame (21) for attachment between a portion of the agricultural implement and at least two wheels (22) of a row unit (18) for traveling along the ground, the row unit (18) also having a tool (23) disposed between the two wheels (22) for engaging the ground, the down pressure assembly also having at least one torsion element (41, 50) disposed on the frame (21), with the torsion element (41, 50) having one fixed mounting to the frame (21) and one adjustable mounting to the frame (21), and the assembly further having an adjustment mechanism (37, 60) for varying the torsion of the torsion element (41, 50) at the adjustable mounting; and at least one down pressure member (36, 56, 57) for receiving a force from the torsion element to apply a downward force to the top members (26, 27) of the frame (21).

24 Claims, 5 Drawing Sheets

ROW UNIT DOWN PRESSURE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

DESCRIPTION OF THE BACKGROUND ART

This invention relates to farm implements that are pulled behind a tractor for tilling, planting or cultivating.

Farm implements include seed planters, cultivators, tillers and other implements. Typically, these implements have a number of individual row units spaced along a trailing bar on the implement, each row unit operating in a row or furrow being planted or cultivated.

It is desired to provide down pressure in such units to keep them from bouncing or leaving a furrow. One method of creating down pressure uses tension springs to create a load between two links. As the links move in parallel, the spring begins to stretch. The loading of the spring tends to pull on the links to apply pressure to keep a working tool on the row unit in the ground.

Compression springs can also be used to create down pressure. These springs are fixed, so that as the row unit moves upwardly from the ground or furrow, the spring is compressed or loaded to provide a reactionary force towards the ground.

Air bags can also be used to provide down pressure. The air bags can be inflated to a selected pressure. The pressure in the bag tends to keep the row unit in the ground while allowing dampening of upward movements.

Another example of a down pressure row unit is illustrated in Prairie, U.S. Pat. No. 6,454,019, assigned to the assignee herein, where a non-spring, elastomeric torsion element is used to provide a down pressure bias pressing the row unit against the ground. The bias is adjusted with a threaded stem and a knob to be adjusted by hand. The threaded member is subject to the need for lubrication when exposed to the environment over periods of time. This adjustment also lacks a visual indicator of discrete adjustments. The down pressure bias cannot be completely disabled in a convenient fashion.

It is desired to provide an improved torsional down pressure row unit providing discrete adjustments including total disablement and lower maintenance requirements.

SUMMARY OF THE INVENTION

At least some embodiments include a down pressure assembly for incorporation into an agricultural implement to be pulled by a tractor, the down pressure assembly comprising an attachment frame for attachment between a front portion of the agricultural implement and at least two wheels of a row unit for traveling along the ground, the row unit also having a tool disposed between the two wheels for engaging the ground, at least one torsion element disposed on the frame, said torsion element having one fixed mounting to the frame and one adjustable mounting to the frame, an adjustment mechanism for varying the torsion of the torsion element at the adjustable mounting; and a down pressure bar receiving a force from the torsion spring to apply a downward force to the frame.

In some embodiments the adjustment mechanism includes a flange with detents, the flange being mounted to the attachment frame, a lever pivotably mounted to the flange and pins for holding the lever in a selected one of the detents. In some cases the down pressure bar has a pivot shaft through the torsion spring, an extension arm extending radially from the pivot shaft and a transverse bar extending laterally from the extension arm and parallel to the pivot shaft to limit the downward rotational movement of the down pressure bar to an abutment with the attachment frame. In some cases the down pressure bar has a pivot shaft through the torsion element and two extension arms extending radially from with pivot arm with laterally extending stops for limiting rotational movement of the down pressure bar to an abutment with the attachment frame.

In some cases the torsion element is a coiled spring, wherein the fixed mounting to the frame is at one end of the coiled spring and wherein the adjustable mounting is at an opposite end of the spring from the first end. In some embodiments the torsion element is a coiled spring, wherein the fixed mounting to the frame is at one end of the coiled spring and wherein the adjustable mounting is at an opposite end of the spring from the first end. In some cases the torsion element can be disabled by releasing the torsion spring from pressure at the adjustable mounting.

In addition, some embodiments include a row unit for incorporation into an agricultural implement to be pulled by a tractor, the row unit assembly comprising at least two wheels for traveling along the ground having a tool between the two wheels for engaging the ground, an attachment frame for attachment between the agricultural implement and the least two wheels for traveling along the ground, at least one torsion spring disposed on the frame, said spring having one fixed mounting to the frame and one adjustable mounting to the frame, an adjustment mechanism for varying the torsion of the spring at the adjustable mounting and a down pressure bar operated by the torsion spring to apply a downward force to the frame.

In some cases the adjustment mechanism includes a flange with detents, the flange being mounted to the attachment frame, a lever pivotably mounted to the flange and pins for holding the lever in a selected one of the detents. In some cases the down pressure bar has a pivot shaft through the torsion spring, an extension arm extending radially from the pivot shaft and a transverse bar extending laterally from the extension arm and parallel to the pivot shaft to limit the downward rotational movement of the down pressure bar to an abutment with the attachment frame. In some cases the down pressure bar has a pivot shaft through the torsion element and two extension arms extending radially from with pivot arm with laterally extending stops for limiting rotational movement of the down pressure bar to an abutment with the attachment frame.

In some cases the fixed mounting to the frame is at one end of the coiled spring and wherein the adjustable mounting is at an opposite end of the spring from the first end. In some cases the torsion spring can be disabled by releasing the torsion spring from pressure at the adjustable mounting. In some cases the agricultural implement is a seed planter.

Some embodiments include a method for use with an agricultural implement to be pulled by a tractor, the method comprising the steps of providing an attachment frame for attachment between a front portion of the agricultural implement and at least two wheels of a row unit for traveling along the ground, the row unit also having a tool disposed between the two wheels for engaging the ground, linking a fixed mounting of a torsion element to the frame and an adjustable mounting of the torsion element to the frame, linking an adjustment mechanism for varying the torsion of the torsion element at the adjustable mounting and linking a down pressure bar to the torsion element to receive a downward force from the frame.

In some cases the step of linking an adjustment mechanism includes linking a mechanism including a flange with detents, the flange being mounted to the attachment frame, a lever pivotally mounted to the flange and pins for holding the lever in a selected one of the detents.

In some embodiments the step of linking a down pressure bar includes linking a bar having a pivot shaft through the torsion spring, an extension arm extending radially from the pivot shaft and a transverse bar extending laterally from the extension arm and parallel to the pivot shaft to limit the downward rotational movement of the down pressure bar to an abutment with the attachment frame.

In some cases the step of linking a down pressure bar includes linking a bar having a pivot shaft through the torsion element and two extension arms extending radially from with pivot arm with laterally extending stops for limiting rotational movement of the down pressure bar to an abutment with the attachment frame.

In some cases the step of linking a torsion element includes linking an element including a coiled spring, wherein the fixed mounting to the frame is at one end of the coiled spring and wherein the adjustable mounting is at an opposite end of the spring from the first end.

DETAILED DESCRIPTION OF THE PREFERRED EMBODIMENTS

Figure 1:
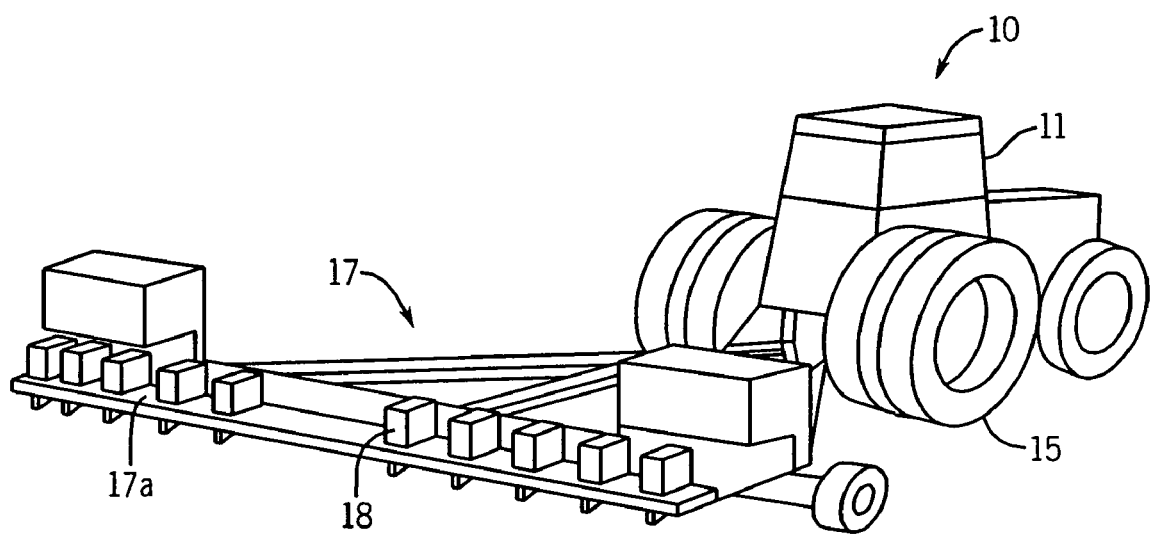
FIG. 1 is a simplified view of an agricultural tractor pulling a seed planter agricultural implement.

Referring to FIG. 1, a tractor 10 is seen pulling an agricultural implement 17, which in this case, is a seed planter. The present invention is also be applicable to cultivators, tillers and other types of agricultural implements. The tractor 10 has a cab 11 and large rear drive wheels 15. The agricultural implement 17 has a trailing planter sub-bar 17a across which individual seed hoppers or row units 18 are spaced apart to dispense seeds along rows made in the ground by other parts of the planter.

Figure 2:
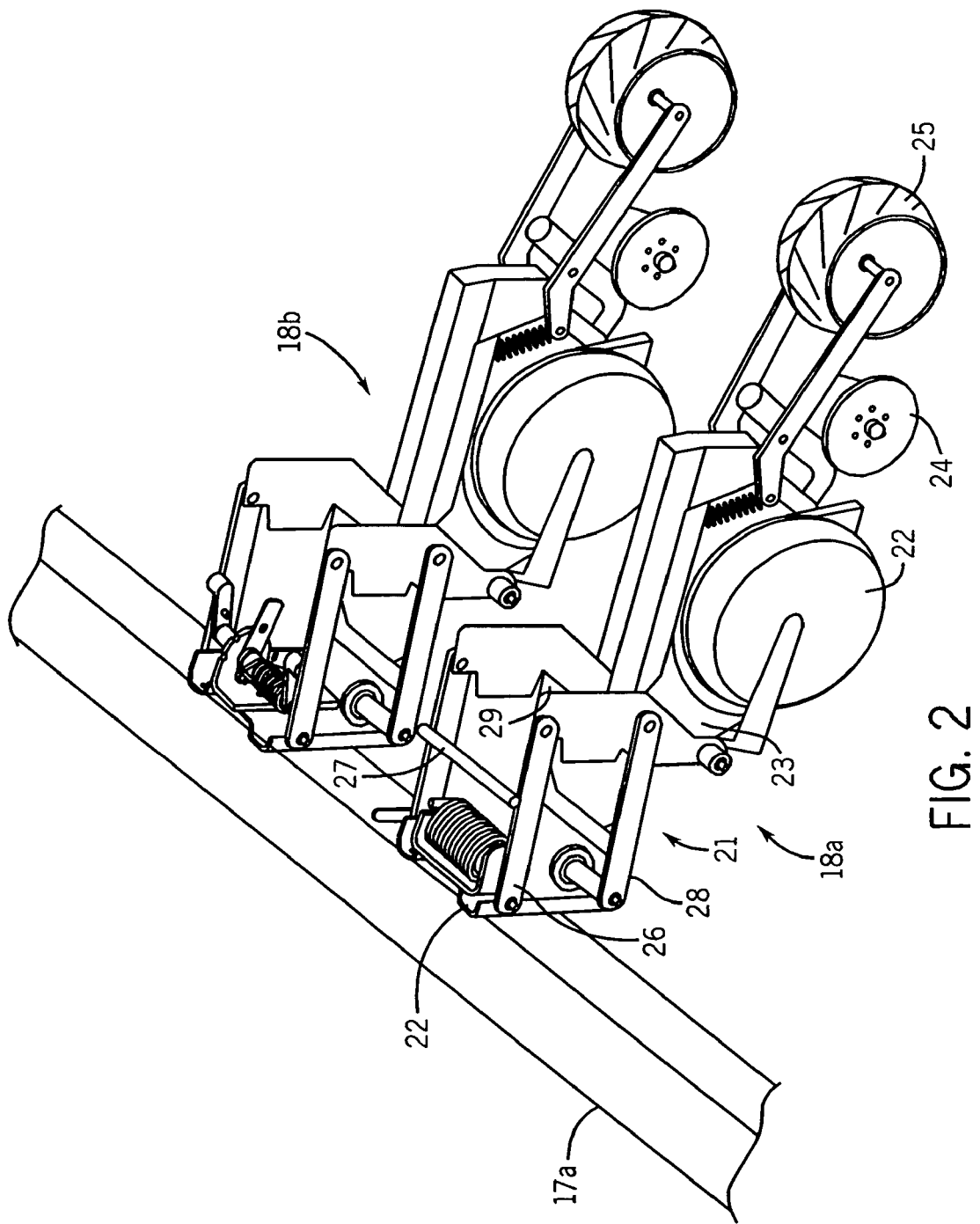
FIG. 2 is a perspective detailed view of two exemplary row units seen in the implement in FIG. 1.

FIG. 2 shows a detail perspective view of the rear end of the implement 17 and a trailing planter sub-bar 17a. Two row units 18a, 18b are each attached to the bar 17a though attachment frame 21. The row units 18a, 18b each have a pair of depth gauge wheels 22, a retractable tool 23 carried between the depth gauge wheels 22, a pair of furrow closing wheels 24 and a trailing compression wheel 25 which are conventional components known in row units in the art. Each attachment frame 21 has a mounting bracket 22 for attachment to the bar 17a and four straight members 26, 27, 28 and 29, typically made of metal, extend laterally rearward from the bar 17a and are spaced apart to four corners on the bracket 22 to define a rectilinear space in between.

Figure 3:
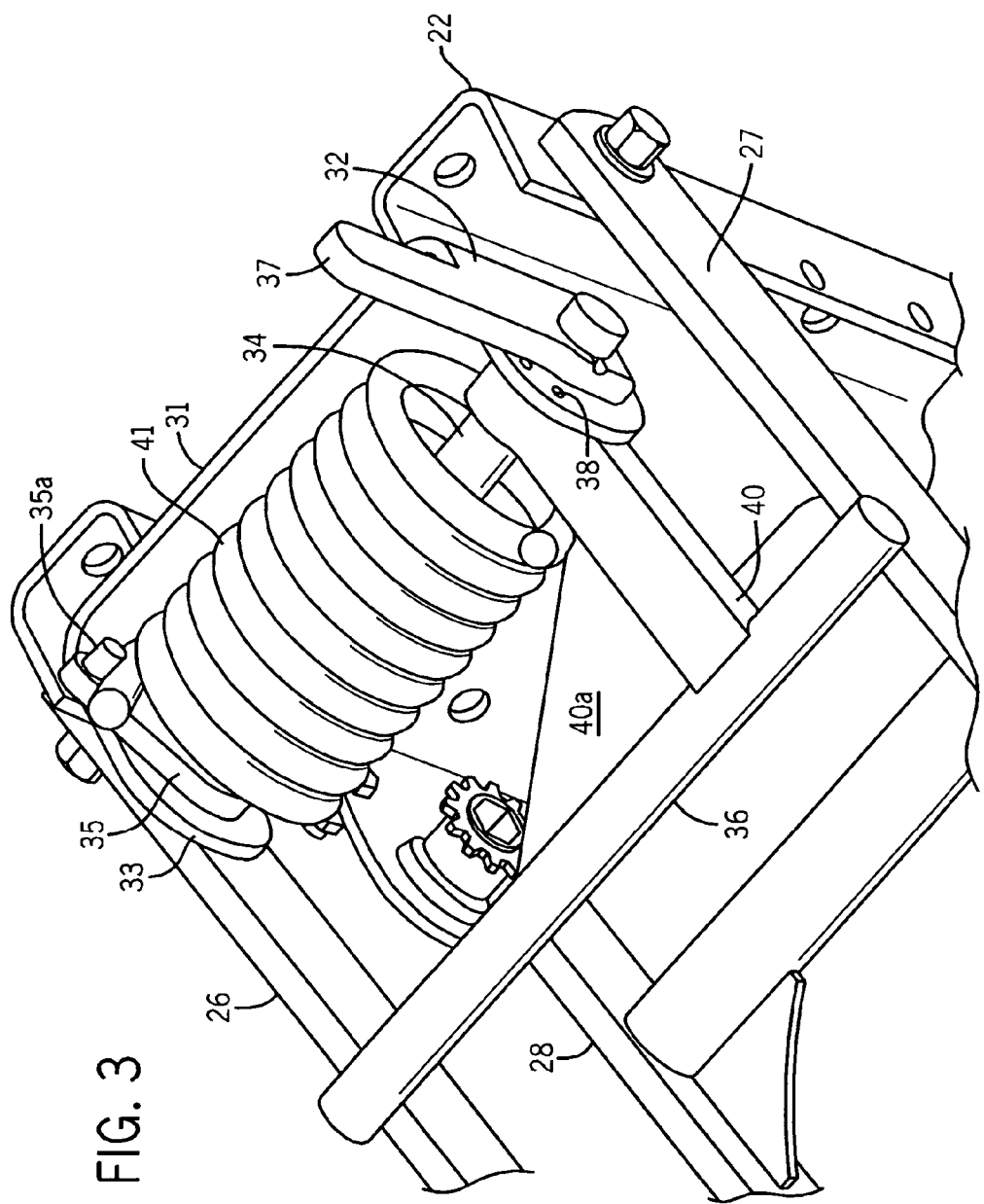
FIG. 3 is a perspective views of a first embodiment of the row unit seen in FIG. 2.

As seen in FIG. 3, a second bracket 31 is mounted to the mounting bracket 22 and has flanges 32, 33 extending rearward. A shaft 34 is carried by the flanges 32, 33 and is rotatable in journals formed by the flanges 32, 33. A cam 35 with an integrally formed retaining post 35a is fixed near one end of the shaft 34 to rotate with the shaft 34. The cam post 35a bears on one end of a torsion spring 41. A transverse cylindrical down pressure bar 36 is fixed through a radial arm 40 near an opposite end of the shaft 34 to rotate with the shaft 34 until it meets the top two members 26, 27 of the mounting frame 24. A lever arm handle 37 is attached to the opposite end of the shaft 34 and has a pin (not shown) that is received in one of several detents 38 formed by holes in the flange 32. By moving the lever arm handle 37 and pin from one detent 38 to another, additional torsional force is applied to one end of a coiled torsion spring 41 through the cam post 35a to store additional kinetic energy in the spring. The other end of the spring is retained by a web 40a associated with down pressure bar 36 and radial arm 40. The stored energy provided by this adjustment then produces a reactionary torsional force that is applied through the down pressure bar 36 to the mounting frame members 26, 27, which in turn applies down pressure to the remainder of the row unit 18.

Figure 4:
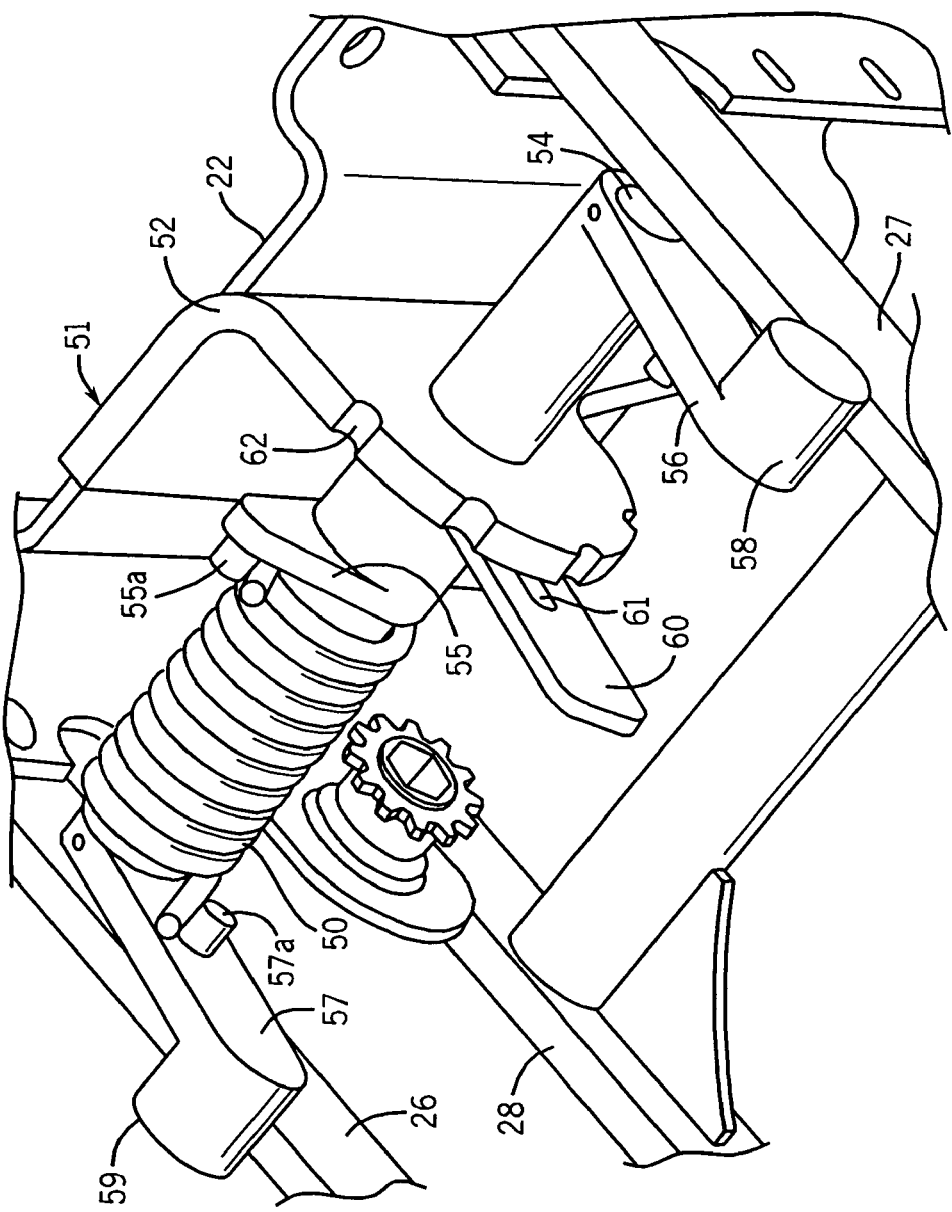
FIGS. 4 and 5 are perspective views of a second embodiment of the row unit of FIG. 2.
Figure 5:
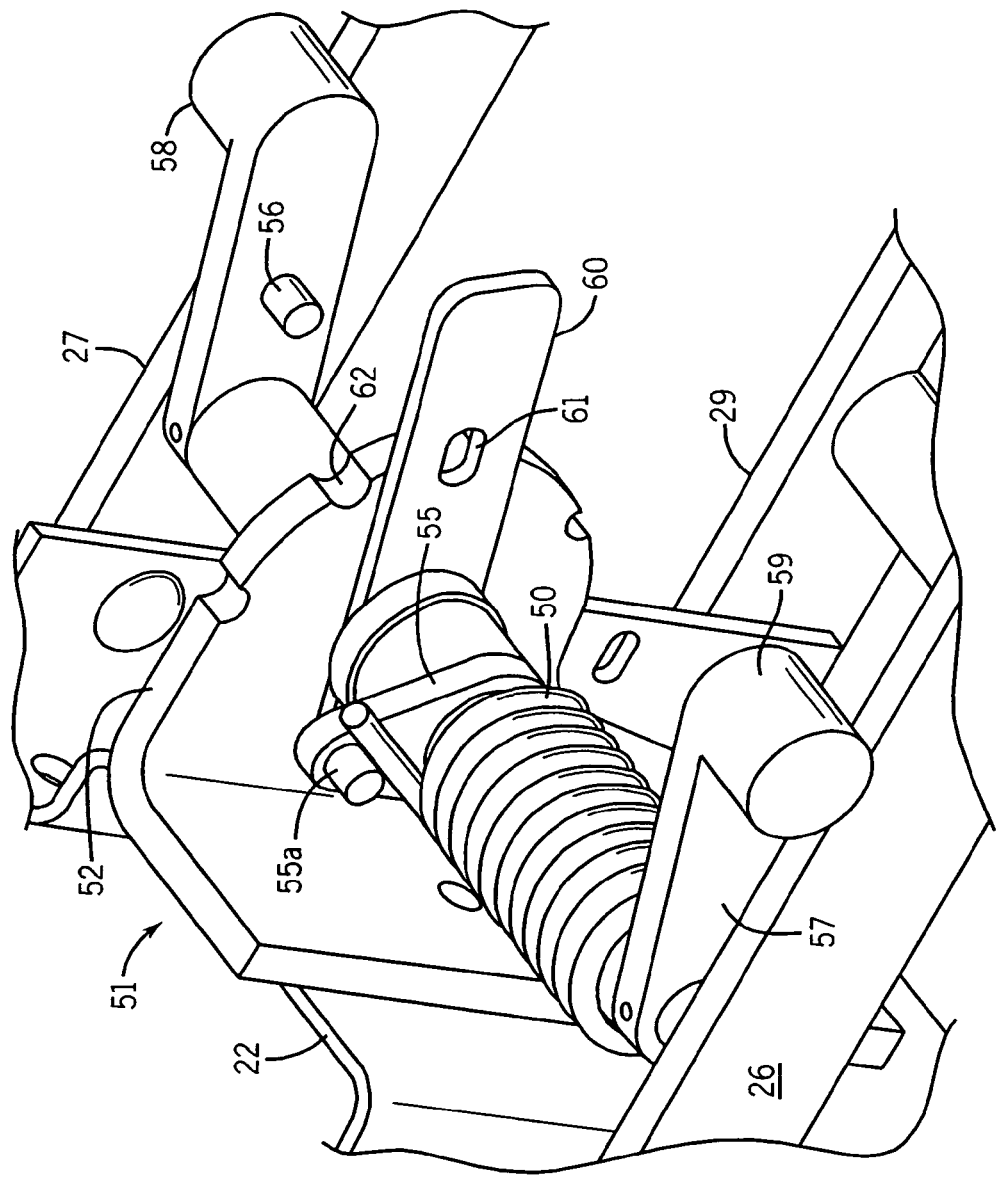

As seen in FIGS. 4 and 5, a second bracket 51 can be mounted to the mounting bracket 22 and has at least one flange 52 extending rearward. A shaft 54 is rotatable in a journal formed by the flange 52. A cam 55 with an integrally formed retaining post 55a is fixed near one end of the shaft 54 closest to the flange 52 to rotate with the shaft 54. Two extension arms 56, 57 extending radially from with shaft 54 with laterally extending stops 58, 59 for limiting rotational movement of the arms 56, 57 to an abutment the top two members 26, 27 of the mounting frame 21. A lever arm handle 60 is integrated with the cam 55, so that when the lever 60 is moved, the cam post 55a can bear with pressure against one end of a coiled spring 50 to tighten the coil and increase kinetic energy stored in the spring 50. The other end is held by cam post 57a on arm 57. This will produce a reactionary force from the spring 50. The lever 60 has an aperture 61 for receiving a pin (not shown) that is also received in one of several detents 62 formed by notches in the flange 52. By moving the lever arm handle 60 from one detent 62 to another, additional torsional energy is applied to one end of the spring through the cam post 55a. The reactionary torsional force is then applied through the down pressure arms 56, 57 to the top members 26, 27 of the attachment frame 21, which in turn applies down pressure to the remainder of the row unit 18. The detents 62 provide visible discrete steps in the amount of down pressure that is selected.

With this construction, it is possible to release all torsion applied by the spring and disable the down pressure by releasing pressure on the ends of the spring coil which pressure is applied by cam posts 35a and 55a.

This has been a description of several preferred embodiments, but it will be apparent to those of ordinary skill in the art that various modifications details of these specific embodiments may be varied without departing from the scope spirit of the present invention, and that such variations are intended to be encompassed by the following claims.

We claim:

1. A down pressure assembly for incorporation into an agricultural implement to be pulled by a tractor, the down pressure assembly comprising:

an attachment frame comprising of a first mounting bracket for attachment to a trailing planter sub-bar and having four straight members extending laterally rearward from said trailing planter sub-bar and are spaced apart to four corners on said mounting bracket to define a rectilinear space in between, said attachment frame for attachment between a front portion of the agricultural implement and at least two wheels of a row unit for traveling along the ground, the row unit also having a tool disposed between the two wheels for engaging the ground;

a second mounting bracket is mounted on said first mounting bracket and has two flanges extending rearward, a shaft is carried by the flanges and is rotatable in journals formed by the flanges, a cam with an integrally formed retaining cam post is fixed near one end of the shaft to rotate with the shaft, the cam post bears on one end of a torsion element, the opposing end of the torsion element is retained by a web attached to a down pressure bar and a radial arm, an adjustment mechanism for varying the torsion of the torsion element mounted on the opposite end of shaft; and said down pressure bar receiving a force from the torsion element to apply a downward force to the attachment frame.

2. The down pressure assembly of claim 1, wherein the adjustment mechanism includes a flange with detents, the flange being mounted to the attachment frame, a lever pivotably mounted to the flange and pins for holding the lever in a selected one of the detents.

3. The down pressure assembly of claim 1, wherein the down pressure bar has a pivot shaft through the torsion element, an extension arm extending radially from the pivot shaft and a transverse bar extending laterally from the extension arm and parallel to the pivot shaft to limit the downward rotational movement of the down pressure bar to an abutment with the attachment frame.

4. The down pressure assembly of claim 1, wherein the down pressure bar has a pivot shaft through the torsion element and two extension arms extending radially from with pivot arm with laterally extending stops for limiting rotational movement of the down pressure bar to an abutment with the attachment frame.

5. The down pressure assembly of claim 4, wherein the torsion element is a coiled spring, wherein the fixed mounting to the frame is at one end of the coiled spring and wherein the adjustable mounting is at an opposite end of the spring from the first end.

6. The down pressure assembly of claim 1, wherein the torsion element is a coiled spring, wherein the fixed mounting to the frame is at one end of the coiled spring and wherein the adjustable mounting is at an opposite end of the spring from the first end.

7. The down pressure assembly of claim 6, wherein the torsion element can be disabled by releasing the torsion spring from pressure at the adjustable mounting.

8. The down pressure assembly of claim 1 wherein the attachment frame includes a bracket mounted to the implement and four bar members pivotally mounted at one end to the bracket, the four bar members extending in substantially parallel directions from the bracket, the down pressure bar applying the downward force directly to at least a subset of the four bar members.

9. A row unit for incorporation into an agricultural implement to be pulled by a tractor, the row unit assembly comprising:

at least two wheels for traveling along the ground having a tool between the two wheels for engaging the ground;

an attachment frame comprising of a first mounting bracket for attachment to a trailing sub-bar and having four straight members extending laterally rearward from said trailing planter sub-bar and are spaced apart to four corners on said mounting bracket to define a rectilinear space in between, said attachment frame for attachment between the agricultural implement and the least two wheels for traveling along the ground;

a second mounting bracket is mounted on said first mounting bracket and has two flanges extending rearward.

a shaft is carried by the flanges and is rotatable in journals formed by the flanges.

a cam with an integrally formed retaining cam post is fixed near one end of the shaft to rotate with the shaft, the cam post bears on one end of a torsion element, the opposing end of the torsion element is retained by a web attached to a down pressure bar and a radial arm, an adjustment mechanism for varying the torsion of the spring mounted at the opposite end of shaft; and said down pressure bar operated by the torsion spring to apply a downward force to the attachment frame.

10. The row unit of claim 9, wherein the adjustment mechanism includes a flange with detents, the flange being mounted to the attachment frame, a lever pivotably mounted to the flange and pins for holding the lever in a selected one of the detents.

11. The row unit of claim 10, wherein the torsion spring can be disabled by releasing the torsion spring from pressure at the adjustable mounting.

12. The row unit of claim 9, wherein the agricultural implement is a seed planter.

13. The row unit of claim 9, wherein the down pressure bar has a pivot shaft through the torsion spring, an extension arm extending radially from the pivot shaft and a transverse bar extending laterally from the extension arm and parallel to the pivot shaft to limit the downward rotational movement of the down pressure bar to an abutment with the attachment frame.

14. The row unit of claim 9, wherein the down pressure bar has a pivot shaft through the torsion element and two extension arms extending radially from with pivot arm with laterally extending stops for limiting rotational movement of the down pressure bar to an abutment with the attachment frame.

15. The row unit of claim 14, wherein the fixed mounting to the frame is at one end of the coiled spring and wherein the adjustable mounting is at an opposite end of the spring from the first end.

16. A method for use with an agricultural implement to be pulled by a tractor, the method comprising the steps of:

providing an attachment frame comprising of a first mounting brackets for attachment to a trailing planter sub-bar and having four straight members extedning laterally rearward from said trailing planter sub-bar and are spaced apart to four corners on said mounting bracket to define a rectilinear space in between, providing said attachment frame for attachment between a front portion of the agricultural implement and at least two wheels of a row unit for traveling along the ground, the row unit also having a tool disposed between the two wheels for engaging the ground;

providing a second mounting bracket to be mounted on said first mounting bracket and has two flanges extending rearward, providing a shaft carried by said flanges and is rotatable in journals formed by the flanges, providing a cam with an integrally formed reaming cam post fixed near one end of the shaft to rotate with the shaft, providing the cam post to bear on one end of a torsion element, providing the opposing end of the trosion element to be retained by a web attached to a down pressure bar and a radial arm, linking an adjustment mechanism for varying the torsion of the torsion element at the opposite end of the shaft; and linking a down pressure bar to the torsion element to receive a downward force from the attachment frame.

17. The method of claim 16 wherein the step of linking an adjustment mechanism includes linking a mechanism including a flange with detents, the flange being mounted to the attachment frame, a lever pivotally mounted to the flange and pins for holding the lever in a selected one of the detents.

18. The method of claim 16 wherein the step of linking a down pressure bar includes linking a bar having a pivot shaft through the torsion spring, an extension arm extending radially from the pivot shaft and a transverse bar extending laterally from the extension arm and parallel to the pivot shaft to limit the downward rotational movement of the down pressure bar to an abutment with the attachment frame.

19. The method of claim 16 wherein the step of linking a down pressure bar includes linking a bar having a pivot shaft through the torsion element and two extension arms extending radially from with pivot arm with laterally extending stops for limiting rotational movement of the down pressure bar to an abutment with the attachment frame.

20. The method of claim 16 wherein the step of linking a torsion element includes linking an element including a coiled spring, wherein the fixed mounting to the frame is at one end of the coiled spring and wherein the adjustable mounting is at an opposite end of the spring from the first end.

21. The method of claim 16 wherein the step of providing an attachment frame includes providing a frame having a bracket mounted to the implement and four bar members pivotally mounted at one end to the bracket, the four bar members extending in substantially parallel directions from the bracket, the step of linking the down pressure bar including the step of linking the bar so that the downward force is applied directly to at least a subset of the four bar members.

22. A down pressure assembly for incorporation into an agricultural implement to be pulled by a tractor, the down pressure assembly comprising:

an attachment frame for attachment between a front portion of the agricultural implement and at least two wheels of a row unit for traveling along the ground, the row unit also having a tool disposed between the two wheels for engaging the ground;

at least one torsion element disposed on the attachment frame, said torsion element having one fixed mounting to the attachment frame and one adjustable mounting to the attachment frame;

an adjustment mechanism for varying the torsion of the torsion element at the adjustable mounting; and a down pressure bar receiving a force from the torsion element to apply a downward force to the attachment frame; wherein the adjustment mechanism includes a flange with detents, the flange being mounted to the attachment frame, a lever pivotably mounted to the flange and pins for holding the lever in a selected one of the detents.

23. A row unit for incorporation into an agricultural implement to be pulled by a tractor, the row unit assembly comprising:

at least two wheels for traveling along the ground having a tool between the two wheels for engaging the ground;

an attachment frame for attachment between the agricultural implement and the least two wheels for traveling along the ground;

at least one torsion spring disposed on the attachment frame, said spring having one fixed mounting to the attachment frame and one adjustable mounting to the attachment frame;

an adjustment mechanism for varying the torsion of the spring at the adjustable mounting; and a down pressure bar operated by the torsion spring to apply a downward force to the attachment frame; wherein the adjustment mechanism includes a flange with detents, the flange being mounted to the attachment frame, a lever pivotably mounted to the flange and pins for holding the lever in a selected one of the detents.

24. A method for use with an agricultural implement to be pulled by a tractor, the method comprising the steps of:

providing an attachment frame for attachment between a front portion of the agricultural implement and at least two wheels of a row unit for traveling along the ground, the row unit also having a tool disposed between the two wheels for engaging the ground;

linking a fixed mounting of a torsion element to the attachment frame and an adjustable mounting of the torsion element to the attachment frame;

linking an adjustment mechanism for varying the torsion of the torsion element at the adjustable mounting; and linking a down pressure bar to the torsion element to receive a downward force from the attachment frame, wherein the step of linking an adjustment mechanism includes linking a mechanism including a flange with detents, the flange being mounted to the attachment frame, a lever pivotally mounted to the flange and pins for holding the lever in a selected one of the detents.

* * * * *